UNITED STATES PATENT OFFICE.

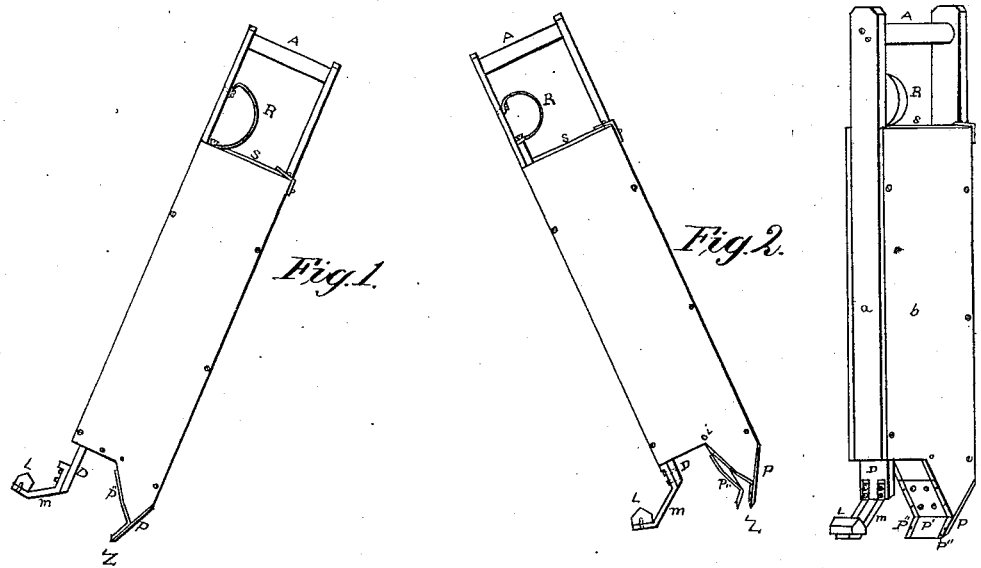

JOHN BEERS, OF GREENVILLE, OHIO.

IMPROVEMENT IN HAND CORN-PLANTERS.

Specification forming part of Letters Patent No. 163,967, dated June 1, 1875; application filed March 13, 1875.

*To all whom it may concern:*

Be it known that I, JOHN BEERS, of Greenville, in the county of Darke and State of Ohio, have invented a new and useful Machine for Planting Corn, called a "Hand Corn-Planter;" and I do hereby declare that the following is a full, clear, and exact description of the construction and operation of the same, reference being had to the annexed drawing making a part of the specification, in which—

Figures 1 and 2 are side elevations of the device, representing the two positions into which it is thrown by the operator in planting. Fig. 3 is a perspective view. Figs. 4 and 5 are sectional elevations, corresponding, respectively, to Figs. 1 and 2, so far as relates to the open and closed position of the jaws. Fig. 6 is a rear elevation.

The remaining figures are detail views.

The invention consists in the construction and arrangement of parts, as hereinafter described and claimed, for effecting the discharge of the corn or other seed from the planter, and depositing it in the earth.

The body of the planter is an oblong rectangular box, $a\ b\ c$, having a handle, A, by which it is carried and operated. The upper portion of the box constitutes a receiving-hopper, B, having a lid, S, and an inclined bottom, E, while the lower portion is occupied by the discharge hopper or chamber C. The seed-slide D traverses both chambers B C, and is provided with a notch, I, at a point contiguous to the diaphragm F between the hoppers. A spring, R, is attached to the upper end of the slide, and a foot, L, to its lower end by means of the bent arms $m$. A projecting downwardly-inclined guard-plate, G, and trip-block K are attached to slide D within the chamber C, said parts G K being separated sufficiently to permit a certain play or extent of movement of the upper end of the plate H. The plate H is arranged diagonally, and pivoted at or near its middle to the fixed arm or support $e$. An angle-plate, P'', is attached to its lower end, and a corresponding one, P, to the bottom of side plate $c$ of the planter. These plates constitute the nose Z of the planter, which penetrates the earth prior to each discharge of seed.

The operation is as follows: The hand of the operator being applied to handle A, the lower end of the planter is thrown forward, as shown in Fig. 1, and as the operator makes his next step the weight of the planter causes the nose Z to enter the earth, and as he continues to advance, the block or foot L is pressed on the surface, so that it pushes up the slide D, which causes the block K to trip plate H and open the jaws P P'', as shown in Fig. 4, whereby a cavity is opened in the earth and the seed discharged into it. When the planter is again thrown forward the slide is forced down by the spring R, and the guard G acts on the plate H and closes the jaws P P''. This movement of the slide D also effects the transfer of seed from hopper B to chamber C, the notch or cavity I being filled with seed when it passes above the cut-off brush $r$, Figs. 8 and 9, attached to diaphragm F, and the quantity thus held being carried down past the cut-off $r$ when the slide moves down. Either the arms $m$ of foot L or the guard G may be made the means of arresting the upward movement of the seed-slide.

What I claim is—

The notched seed-slide D, acted on by a spring, and having guard G, block K, and foot L, in combination with the pivoted plate H, carrying jaw P'', and the seed-box, having corresponding jaw P, and the chambers B C, separated by diaphragm F, all arranged as shown and described, to operate as specified.

JOHN BEERS.

Witnesses:
   DAVID BEERS,
   FRANCES GREEN.